US007180522B2

(12) United States Patent
Radke et al.

(10) Patent No.: US 7,180,522 B2
(45) Date of Patent: Feb. 20, 2007

(54) APPARATUS AND METHOD FOR DISTRIBUTED MEMORY CONTROL IN A GRAPHICS PROCESSING SYSTEM

(75) Inventors: William Radke, San Francisco, CA (US); James R. Peterson, Portland, OR (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 10/931,376

(22) Filed: Aug. 31, 2004

(65) Prior Publication Data

US 2005/0030313 A1    Feb. 10, 2005

Related U.S. Application Data

(63) Continuation of application No. 09/603,158, filed on Jun. 23, 2000, now Pat. No. 6,791,555.

(51) Int. Cl.
*G09G 5/39* (2006.01)
*G06F 13/00* (2006.01)
(52) U.S. Cl. .............. 345/531; 345/532; 345/536; 345/537; 345/538
(58) Field of Classification Search ........ 345/531, 345/532, 536–538, 544, 564, 565; 710/22–24; 711/170–173
See application file for complete search history.

(56) References Cited

U.S. PATENT DOCUMENTS

| 4,045,781 A | 8/1977 | Levy et al. ............ 364/200 |
| 4,240,143 A | 12/1980 | Besemer et al. ........ 364/200 |
| 4,245,306 A | 1/1981 | Besemer et al. ........ 364/200 |
| 4,253,144 A | 2/1981 | Bellamy et al. ........ 364/200 |
| 4,253,146 A | 2/1981 | Bellamy et al. ........ 364/200 |

(Continued)

FOREIGN PATENT DOCUMENTS

EP    0849685 A2    6/1998

(Continued)

OTHER PUBLICATIONS

Intel, "Flash Memory PCI Add-In Card for Embedded Systems", Application Note AP-758, Sep. 1997, pp. i-13.

(Continued)

*Primary Examiner*—Kee M. Tung
*Assistant Examiner*—Hau Nguyen
(74) *Attorney, Agent, or Firm*—Dorsey & Whitney LLP (57) ABSTRACT

A distributed memory controller memory system for a graphics processing system having addressable memory areas each coupled to a respective memory controller. The memory controllers are further coupled to each other through a memory controller bus upon which a memory access request and data may be passed from one memory controller to other memory controller. A memory access request to a memory location in one addressable memory area, but received by a memory controller coupled to another addressable memory area, is passed through the memory controller bus from the receiving memory controller to the memory controller coupled to the addressable memory area in which the requested location is located in order to service the memory access request. Additional memory controllers coupled to a respective addressable memory area may be included in the memory system. The memory controllers are coupled to the memory controller bus in order to receive and pass memory access requests from the other memory controllers.

19 Claims, 5 Drawing Sheets

U.S. PATENT DOCUMENTS

| | | | | |
|---|---|---|---|---|
| 4,507,730 | A | 3/1985 | Johnson et al. | 364/200 |
| 4,608,702 | A | 8/1986 | Hirzel et al. | 375/110 |
| 4,707,823 | A | 11/1987 | Holdren et al. | 370/1 |
| 4,724,520 | A | 2/1988 | Athanas et al. | 364/200 |
| 4,891,808 | A | 1/1990 | Williams | 370/112 |
| 4,930,128 | A | 5/1990 | Suzuki et al. | 371/12 |
| 4,953,930 | A | 9/1990 | Ramsey et al. | 350/96.11 |
| 5,241,506 | A | 8/1993 | Motegi et al. | 365/210 |
| 5,243,703 | A | 9/1993 | Farmwald et al. | 395/325 |
| 5,251,303 | A | 10/1993 | Fogg, Jr. et al. | 395/275 |
| 5,269,022 | A | 12/1993 | Shinjo et al. | 395/700 |
| 5,317,752 | A | 5/1994 | Jewett et al. | 395/750 |
| 5,319,755 | A | 6/1994 | Farmwald et al. | 395/325 |
| 5,327,553 | A | 7/1994 | Jewett et al. | 395/575 |
| 5,355,391 | A | 10/1994 | Horowitz et al. | 375/36 |
| 5,357,621 | A | 10/1994 | Cox | 395/400 |
| 5,432,823 | A | 7/1995 | Gasbarro et al. | 375/356 |
| 5,432,907 | A | 7/1995 | Picazo, Jr. et al. | 395/200 |
| 5,442,770 | A | 8/1995 | Barratt | 395/403 |
| 5,461,627 | A | 10/1995 | Rypinski | 370/95.2 |
| 5,465,229 | A | 11/1995 | Bechtolsheim et al. | 345/477 |
| 5,479,370 | A | 12/1995 | Furuyama et al. | 365/189.12 |
| 5,497,476 | A | 3/1996 | Oldfield et al. | 395/439 |
| 5,502,621 | A | 3/1996 | Schumacher et al. | 361/760 |
| 5,522,062 | A * | 5/1996 | Yamaki | 711/172 |
| 5,544,319 | A | 8/1996 | Acton et al. | 395/200.07 |
| 5,566,325 | A | 10/1996 | Bruce, II et al. | 395/494 |
| 5,577,220 | A | 11/1996 | Combs et al. | 395/416 |
| 5,581,767 | A | 12/1996 | Katsuki et al. | 395/800 |
| 5,606,717 | A | 2/1997 | Farmwald et al. | 395/856 |
| 5,638,334 | A | 6/1997 | Farmwald et al. | 365/230.03 |
| 5,638,534 | A | 6/1997 | Mote, Jr. | 395/485 |
| 5,659,798 | A | 8/1997 | Blumrich et al. | 395/846 |
| 5,706,224 | A | 1/1998 | Srinivasan et al. | 365/49 |
| 5,715,456 | A | 2/1998 | Bennett et al. | 395/652 |
| 5,729,709 | A | 3/1998 | Harness | 395/405 |
| 5,748,616 | A | 5/1998 | Riley | 370/242 |
| 5,796,413 | A | 8/1998 | Shipp et al. | 345/522 |
| 5,818,844 | A | 10/1998 | Singh et al. | 370/463 |
| 5,819,304 | A | 10/1998 | Nilsen et al. | 711/5 |
| 5,822,255 | A | 10/1998 | Uchida | 365/194 |
| 5,832,250 | A | 11/1998 | Whittaker | 395/471 |
| 5,875,352 | A | 2/1999 | Gentry et al. | 395/843 |
| 5,875,454 | A | 2/1999 | Craft et al. | 711/113 |
| 5,887,159 | A | 3/1999 | Burrows | 395/567 |
| 5,928,343 | A | 7/1999 | Farmwald et al. | 710/104 |
| 5,966,724 | A | 10/1999 | Ryan | 711/105 |
| 5,973,935 | A | 10/1999 | Schoenfeld et al. | 361/813 |
| 5,973,951 | A | 10/1999 | Bechtolsheim et al. | 365/52 |
| 5,978,567 | A | 11/1999 | Rebane et al. | 395/200.49 |
| 5,987,196 | A | 11/1999 | Noble | 385/14 |
| 6,023,726 | A | 2/2000 | Saksena | 709/219 |
| 6,029,250 | A | 2/2000 | Keeth | 713/400 |
| 6,031,241 | A | 2/2000 | Silfvast et al. | 250/504 R |
| 6,033,951 | A | 3/2000 | Chao | 438/253 |
| 6,061,263 | A | 5/2000 | Boaz et al. | 365/51 |
| 6,061,296 | A | 5/2000 | Ternullo, Jr. et al. | 365/233 |
| 6,067,262 | A | 5/2000 | Irrinki et al. | 365/201 |
| 6,070,231 | A * | 5/2000 | Ottinger | 711/141 |
| 6,073,190 | A | 6/2000 | Rooney | 710/56 |
| 6,076,139 | A | 6/2000 | Welker et al. | 711/104 |
| 6,079,008 | A | 6/2000 | Clery, III | 712/11 |
| 6,092,158 | A | 7/2000 | Harriman et al. | 711/151 |
| 6,098,158 | A | 8/2000 | Lay et al. | 711/162 |
| 6,105,075 | A | 8/2000 | Ghaffari | 710/5 |
| 6,125,431 | A | 9/2000 | Kobayashi | 711/154 |
| 6,128,703 | A | 10/2000 | Bourekas et al. | 711/138 |
| 6,128,706 | A | 10/2000 | Bryg et al. | 711/141 |
| 6,131,149 | A | 10/2000 | Lu et al. | 711/167 |
| 6,134,624 | A | 10/2000 | Burns et al. | 710/131 |
| 6,137,709 | A | 10/2000 | Boaz et al. | 365/51 |
| 6,144,587 | A | 11/2000 | Yoshida | 365/189.05 |
| 6,145,033 | A | 11/2000 | Chee | 710/57 |
| 6,157,743 | A | 12/2000 | Goris et al. | 382/233 |
| 6,167,465 | A | 12/2000 | Parvin et al. | 710/22 |
| 6,167,486 | A | 12/2000 | Lee et al. | 711/120 |
| 6,175,571 | B1 | 1/2001 | Haddock et al. | 370/423 |
| 6,185,352 | B1 | 2/2001 | Hurley | 385/114 |
| 6,185,676 | B1 | 2/2001 | Poplingher et al. | 712/239 |
| 6,186,400 | B1 | 2/2001 | Dvorkis et al. | 235/462.45 |
| 6,191,663 | B1 | 2/2001 | Hannah | 333/17.3 |
| 6,201,724 | B1 | 3/2001 | Ishizaki et al. | 365/49 |
| 6,208,180 | B1 | 3/2001 | Fisch et al. | 327/141 |
| 6,212,590 | B1 | 4/2001 | Melo et al. | 710/119 |
| 6,219,725 | B1 | 4/2001 | Diehl et al. | 710/26 |
| 6,223,301 | B1 | 4/2001 | Santeler et al. | 714/6 |
| 6,233,376 | B1 | 5/2001 | Updegrove | 385/14 |
| 6,243,769 | B1 | 6/2001 | Rooney | 710/56 |
| 6,243,831 | B1 | 6/2001 | Mustafa et al. | 714/24 |
| 6,246,618 | B1 | 6/2001 | Yamamoto et al. | 365/200 |
| 6,247,107 | B1 | 6/2001 | Christie | 711/216 |
| 6,249,802 | B1 | 6/2001 | Richardson et al. | 709/200 |
| 6,252,612 | B1 | 6/2001 | Jeddeloh | 345/521 |
| 6,256,692 | B1 | 7/2001 | Yoda et al. | 710/104 |
| 6,272,609 | B1 | 8/2001 | Jeddeloh | 711/169 |
| 6,285,349 | B1 | 9/2001 | Smith | 345/147 |
| 6,286,083 | B1 | 9/2001 | Chin et al. | 711/151 |
| 6,294,937 | B1 | 9/2001 | Crafts et al. | 327/158 |
| 6,301,637 | B1 | 10/2001 | Krull et al. | 711/112 |
| 6,327,642 | B1 | 12/2001 | Lee et al. | 711/120 |
| 6,330,205 | B2 | 12/2001 | Shimizu et al. | 365/230.06 |
| 6,347,055 | B1 | 2/2002 | Motomura | 365/189.05 |
| 6,349,363 | B2 | 2/2002 | Cai et al. | 711/129 |
| 6,356,573 | B1 | 3/2002 | Jonsson et al. | 372/46 |
| 6,367,074 | B1 | 4/2002 | Bates et al. | 717/11 |
| 6,370,068 | B2 | 4/2002 | Rhee | 365/196 |
| 6,370,611 | B1 | 4/2002 | Callison et al. | 711/105 |
| 6,373,777 | B1 | 4/2002 | Suzuki | 365/230.03 |
| 6,381,190 | B1 | 4/2002 | Shinkai | 365/230.03 |
| 6,389,514 | B1 | 5/2002 | Rokicki | 711/136 |
| 6,392,653 | B1 | 5/2002 | Malandain et al. | 345/501 |
| 6,401,213 | B1 | 6/2002 | Jeddeloh | 713/401 |
| 6,405,280 | B1 | 6/2002 | Ryan | 711/105 |
| 6,421,744 | B1 | 7/2002 | Morrison et al. | 710/22 |
| 6,430,696 | B1 | 8/2002 | Keeth | 713/503 |
| 6,433,785 | B1 | 8/2002 | Garcia et al. | 345/531 |
| 6,434,639 | B1 | 8/2002 | Haghighi | 710/39 |
| 6,434,696 | B1 | 8/2002 | Kang | 713/2 |
| 6,434,736 | B1 | 8/2002 | Schaecher et al. | 716/17 |
| 6,438,622 | B1 | 8/2002 | Haghighi et al. | 710/1 |
| 6,438,668 | B1 | 8/2002 | Esfahani et al. | 711/165 |
| 6,449,308 | B1 | 9/2002 | Knight, Jr. et al. | 375/212 |
| 6,453,393 | B1 | 9/2002 | Holman et al. | 711/154 |
| 6,460,108 | B1 | 10/2002 | McCoskey et al. | 710/310 |
| 6,460,114 | B1 | 10/2002 | Jeddeloh | 711/120 |
| 6,462,978 | B2 | 10/2002 | Shibata et al. | 365/63 |
| 6,463,059 | B1 | 10/2002 | Movshovich et al. | 370/389 |
| 6,470,422 | B2 | 10/2002 | Cai et al. | 711/129 |
| 6,473,828 | B1 | 10/2002 | Matsui | 711/104 |
| 6,477,592 | B1 | 11/2002 | Chen et al. | 710/52 |
| 6,477,614 | B1 | 11/2002 | Leddige et al. | 711/5 |
| 6,477,621 | B1 | 11/2002 | Lee et al. | 711/120 |
| 6,479,322 | B2 | 11/2002 | Kawata et al. | 438/109 |
| 6,487,628 | B1 | 11/2002 | Duong et al. | 710/313 |
| 6,490,188 | B2 | 12/2002 | Nuxoll et al. | 365/63 |
| 6,493,803 | B1 | 12/2002 | Pham et al. | 711/147 |
| 6,496,193 | B1 | 12/2002 | Surti et al. | 345/552 |
| 6,496,909 | B1 | 12/2002 | Schimmel | 711/163 |
| 6,501,471 | B1 | 12/2002 | Venkataraman et al. | 345/424 |
| 6,505,287 | B2 | 1/2003 | Uematsu | 711/170 |
| 6,523,092 | B1 | 2/2003 | Fanning | 711/134 |
| 6,523,093 | B1 | 2/2003 | Bogin et al. | 711/137 |
| 6,526,483 | B1 | 2/2003 | Cho et al. | 711/154 |
| 6,539,490 | B1 | 3/2003 | Forbes et al. | 713/401 |

| | | | | | | |
|---|---|---|---|---|---|---|
| 6,552,564 B1 | 4/2003 | Forbes et al. ............... 326/30 | | 2003/0043158 A1 | 3/2003 | Wasserman et al. ........ 345/545 |
| 6,564,329 B1 | 5/2003 | Cheung et al. ............. 713/322 | | 2003/0043426 A1 | 3/2003 | Baker et al. ................ 359/109 |
| 6,587,912 B2 | 7/2003 | Leddige et al. ................ 711/5 | | 2003/0093630 A1 | 5/2003 | Richard et al. ............. 711/154 |
| 6,590,816 B2 | 7/2003 | Perner ........................ 365/200 | | 2003/0149809 A1 | 8/2003 | Jensen et al. ................. 710/22 |
| 6,594,713 B1 | 7/2003 | Fuoco et al. .................. 710/31 | | 2003/0163649 A1 | 8/2003 | Kapur et al. ................ 711/146 |
| 6,594,722 B1 | 7/2003 | Willke, II et al. ........... 710/313 | | 2003/0177320 A1 | 9/2003 | Sah et al. .................... 711/158 |
| 6,598,154 B1 | 7/2003 | Vaid et al. ................... 712/237 | | 2003/0193927 A1 | 10/2003 | Hronik ....................... 370/351 |
| 6,615,325 B2 | 9/2003 | Mailloux et al. ............ 711/154 | | 2003/0217223 A1 | 11/2003 | Nino, Jr. et al. ............. 711/105 |
| 6,622,227 B2 | 9/2003 | Zumkehr et al. ............ 711/167 | | 2003/0227798 A1 | 12/2003 | Pax ....................... 365/189.12 |
| 6,628,294 B1 | 9/2003 | Sadowsky et al. .......... 345/568 | | 2003/0229762 A1 | 12/2003 | Maiyuran et al. ........... 711/137 |
| 6,629,220 B1 | 9/2003 | Dyer ........................... 711/158 | | 2003/0229770 A1 | 12/2003 | Jeddeloh ..................... 711/213 |
| 6,631,440 B2 | 10/2003 | Jenne et al. ................. 711/105 | | 2004/0019728 A1 | 1/2004 | Sharma ...................... 710/306 |
| 6,636,110 B1 | 10/2003 | Ooishi et al. ................ 327/565 | | 2004/0022094 A1 | 2/2004 | Radhakrishnan et al. ... 365/200 |
| 6,646,929 B1 | 11/2003 | Moss et al. .................. 365/194 | | 2004/0024959 A1 | 2/2004 | Taylor ........................ 711/105 |
| 6,647,470 B1 | 11/2003 | Janzen ........................ 711/154 | | 2004/0024978 A1 | 2/2004 | Jeddeloh ..................... 711/154 |
| 6,658,509 B1 | 12/2003 | Bonella et al. .............. 710/100 | | 2004/0034753 A1 | 2/2004 | Jeddeloh ..................... 711/163 |
| 6,662,304 B2 | 12/2003 | Keeth et al. ................. 713/400 | | 2004/0044833 A1 | 3/2004 | Ryan ............................. 711/5 |
| 6,665,202 B2 | 12/2003 | Lindahl et al. ................ 365/49 | | 2004/0044857 A1 | 3/2004 | Jeddeloh et al. ............. 711/154 |
| 6,667,895 B2 | 12/2003 | Jang et al. ..................... 365/63 | | 2004/0064602 A1 | 4/2004 | George ......................... 710/22 |
| 6,681,292 B2 | 1/2004 | Creta et al. .................. 711/119 | | 2004/0122988 A1 | 6/2004 | Han et al. ....................... 710/5 |
| 6,697,926 B2 | 2/2004 | Johnson et al. ............. 711/167 | | 2004/0126115 A1 | 7/2004 | Levy et al. .................. 398/116 |
| 6,704,817 B1 | 3/2004 | Steinman et al. ........... 710/100 | | 2004/0144994 A1 | 7/2004 | Lee et al. .................... 257/200 |
| 6,715,018 B2 | 3/2004 | Farnworth et al. .......... 710/300 | | 2004/0158677 A1 | 8/2004 | Dodd ......................... 711/118 |
| 6,718,440 B2 | 4/2004 | Maiyuran et al. ........... 711/137 | | 2004/0236885 A1 | 11/2004 | Fredriksson et al. ........ 710/100 |
| 6,721,195 B2 | 4/2004 | Brunelle et al. ............... 365/63 | | 2004/0260864 A1 | 12/2004 | Lee et al. .................... 711/101 |
| 6,724,685 B2 | 4/2004 | Braun et al. ................. 365/233 | | 2004/0260891 A1 | 12/2004 | Jeddeloh et al. ............. 711/154 |
| 6,728,800 B1 | 4/2004 | Lee et al. ...................... 710/54 | | 2004/0260909 A1 | 12/2004 | Lee et al. .................... 711/213 |
| 6,731,548 B2 | 5/2004 | Pax ....................... 365/189.12 | | 2005/0044327 A1 | 2/2005 | Howard et al. ............. 711/147 |
| 6,735,679 B1 | 5/2004 | Herbst et al. ................ 711/167 | | 2005/0066137 A1 | 3/2005 | Jeddeloh et al. ............. 711/154 |
| 6,735,682 B2 | 5/2004 | Segelken et al. ............ 711/220 | | 2005/0071542 A1 | 3/2005 | Weber et al. ................ 711/105 |
| 6,745,275 B2 | 6/2004 | Chang ......................... 710/305 | | 2005/0149774 A1 | 7/2005 | Jeddeloh et al. ............. 713/500 |
| 6,751,703 B2 | 6/2004 | Chilton ........................ 711/113 | | 2005/0172084 A1 | 8/2005 | Jeddeloh ..................... 711/154 |
| 6,754,117 B2 | 6/2004 | Jeddeloh .................... 365/201 | | 2005/0216648 A1 | 9/2005 | Jeddeloh ..................... 710/311 |
| 6,754,812 B1 | 6/2004 | Abdallah et al. ............ 712/234 | | 2005/0216678 A1 | 9/2005 | Jeddeloh ..................... 711/154 |
| 6,756,661 B2 | 6/2004 | Tsuneda et al. ............. 257/673 | | 2005/0218956 A1 | 10/2005 | LaBerge ...................... 327/291 |
| 6,760,833 B1 | 7/2004 | Dowling ...................... 712/34 | | 2005/0223161 A1 | 10/2005 | Jeddeloh ..................... 711/105 |
| 6,771,538 B2 | 8/2004 | Shukuri et al. ......... 365/185.05 | | 2005/0228939 A1 | 10/2005 | Janzen ........................ 711/105 |
| 6,772,295 B2 | 8/2004 | Spencer et al. .............. 711/137 | | 2005/0246558 A1 | 11/2005 | Ku .............................. 713/300 |
| 6,775,747 B2 | 8/2004 | Venkatraman .............. 711/137 | | 2005/0257005 A1 | 11/2005 | Jeddeloh ..................... 711/115 |
| 6,789,173 B1 | 9/2004 | Tanaka et al. ............... 711/147 | | 2005/0286506 A1 | 12/2005 | LaBerge ...................... 370/363 |
| 6,792,059 B2 | 9/2004 | Yuan et al. ................... 375/354 | | 2006/0085616 A1 | 4/2006 | Zeighami et al. ............ 711/167 |
| 6,792,496 B2 | 9/2004 | Aboulenein et al. ........ 710/306 | | | | |
| 6,795,899 B2 | 9/2004 | Dodd et al. .................. 711/137 | | | | |

FOREIGN PATENT DOCUMENTS

| | | |
|---|---|---|
| JP | 2001265539 A | 9/2001 |
| WO | WO 93/19422 | 9/1993 |
| WO | WO 02/27499 A2 | 4/2002 |

OTHER PUBLICATIONS

Shanley, T. et al., "PCI System Architecture", Third Edition, Mindshare, Inc., 1995, pp. 24-25.

"Free On-Line Dictionary of Computing" entry Flash Erasable Programmable Read-Only Memory, online May 17, 2004 [http://foldoc.doc.ic.ac.uk/foldoc/foldoc.cgi?flash+memory].

Intel, "Intel 840 Chipset: 82840 Memory Controller Hub (MCH)", Datasheet, Oct. 1999, pp. 1-178.

Micron Technology, Inc., "Synchronous DRAM Module 512MB/1GB (x72, ECC) 168-PIN Registered FBGA SDRAM DIMM", Micron Technology, Inc., 2002, pp. 1-23.

Hellwagner, H. et al., *"Enabling a PC Cluster for High-Performace Computing"*, The SPEEDUP Journal, vol. 11, No. 1, Jun. 1997, pp. 1-9.

* cited by examiner

| | | | |
|---|---|---|---|
| 6,799,246 B1 | 9/2004 | Wise et al. .................. 711/147 |
| 6,799,268 B1 | 9/2004 | Boggs et al. ................ 712/228 |
| 6,804,760 B2 | 10/2004 | Wiliams ...................... 711/170 |
| 6,804,764 B2 | 10/2004 | LaBerge et al. ............. 711/170 |
| 6,807,630 B2 | 10/2004 | Lay et al. ....................... 713/2 |
| 6,811,320 B1 | 11/2004 | Abbott ......................... 385/58 |
| 6,816,947 B1 | 11/2004 | Huffman ..................... 711/151 |
| 6,820,181 B2 | 11/2004 | Jeddeloh et al. ............. 711/169 |
| 6,821,029 B1 | 11/2004 | Grung et al. .................. 385/92 |
| 6,823,023 B1 | 11/2004 | Hannah ....................... 375/296 |
| 6,829,705 B2 | 12/2004 | Smith ............................. 713/1 |
| 6,845,409 B1 | 1/2005 | Talagala et al. .............. 710/20 |
| 6,889,304 B2 | 5/2005 | Perego et al. ................ 711/170 |
| 6,910,109 B2 | 6/2005 | Holman et al. ............. 711/156 |
| 6,980,042 B2 | 12/2005 | LaBerge ...................... 327/291 |
| 2001/0039612 A1 | 11/2001 | Lee .................................. 713/2 |
| 2002/0112119 A1 | 8/2002 | Halbert et al. ............... 711/115 |
| 2002/0116588 A1 | 8/2002 | Beckert et al. | |
| 2002/0144064 A1 | 10/2002 | Fanning ....................... 711/144 |
| 2002/0178319 A1 | 11/2002 | Sanchez-Olea ............. 710/305 |
| 2003/0005223 A1 | 1/2003 | Coulson et al. ............. 711/118 |

APPARATUS AND METHOD FOR DISTRIBUTED MEMORY CONTROL IN A GRAPHICS PROCESSING SYSTEM

CROSS-REFERENCE TO RELATED APPLICATION

This application is a continuation of U.S. patent application No. 09/603,158, filed Jun. 23, 2000 now U.S. Pat. No. 6,791,555.

TECHNICAL FIELD

The present invention is related generally to the field of computer graphics, and more particularly, to a memory system for use in a computer graphics processing system.

BACKGROUND OF THE INVENTION

A heterogeneous memory system is a memory system where several different memories, or levels of memory, are used to satisfy memory demands of an computer application. An example of an application for a heterogeneous memory system is in graphics processing systems. Different levels of memory are used by a graphics processing system to facilitate graphics processing and rendering of graphics images on a display. A first level of memory is typically embedded memory that is fabricated directly on the same semiconductor substrate as a graphics processor. Embedded memory can provide data to the graphics processor at very low access times, and consequently, increase the speed at which graphics data may be processed. A second level of memory is typically memory that is external to the device, but located on the same graphics card as the graphics processor. Memory such as this is commonly referred to as external, or local memory. A third level of memory is AGP memory, or host memory that the graphics processor can access through a system bus. Host memory generally has the greatest access time of the three levels of memories because the graphics processor can only access the AGP memory via a system bus and several different memory and bus controllers. Although local memory can provide data more quickly than the host memory, it still is considerably slower than the embedded memory of the first level of memory.

Figure 1:
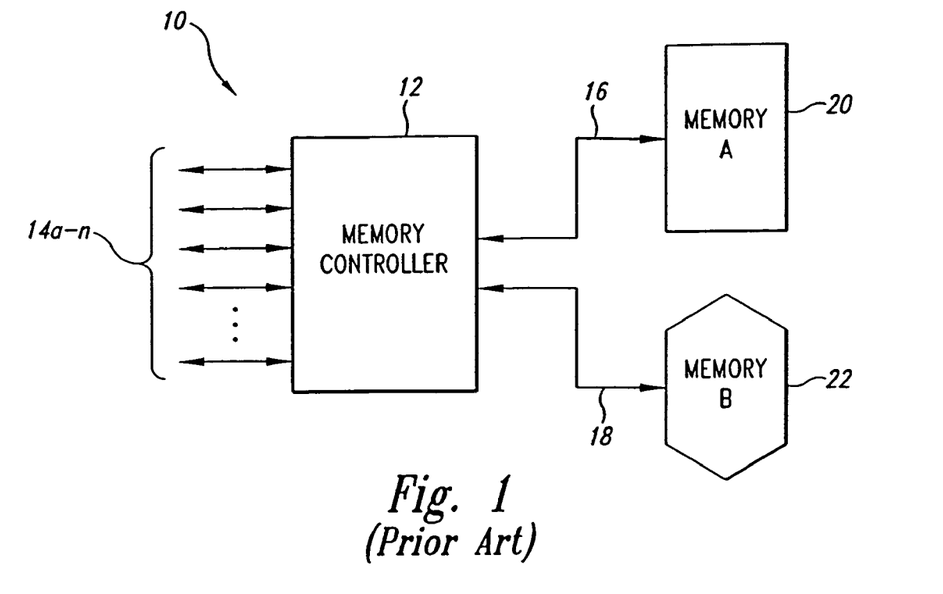
FIG. 1 is a block diagram of a conventional heterogeneous memory system.

For a conventional heterogeneous memory system, there are two typical arrangements. A first example of a heterogeneous memory system is arranged with a single memory controller to handle all memory accesses. Such an arrangement is illustrated in FIG. 1. The memory system 10 includes a central memory controller 12 coupled to both memory 20 through memory bus 16, and memory 22 through memory bus 18. The memory 20 may be representative of embedded memory, and the memory 22 may be representative of external memory. In operation, the central memory controller 12 receives memory access requests from various requesting entities, such as a graphics processor, over buses 14a–n. The central memory controller 12 services the various memory access requests by determining whether the requested memory address is located in the memory 20 or the memory 22. The appropriate memory device is accessed and data is written to or read therefrom. An arrangement such as memory system 10 has the advantage that additional memory may be easily added because all memory access requests are serviced by the central memory controller 12. For the same reason, the various memory access requests can all be handled seamlessly by the central memory controller 12. That is, when a memory access request is made, only the central memory controller 12 must determine which memory, either memory 20 or memory 22, to access. However, a problem with the arrangement of memory system 10 is that there are physical limitations as to the number of buses 14a–n that may be routed to the memory controller 12. Additionally, as the complexity of the central memory controller 12 increases to accommodate a greater number of memory access requests, the amount of space the central memory controller occupies also increases. Thus, space overhead issues become a concern in applications where small graphics processing systems are desired.

Figure 2:
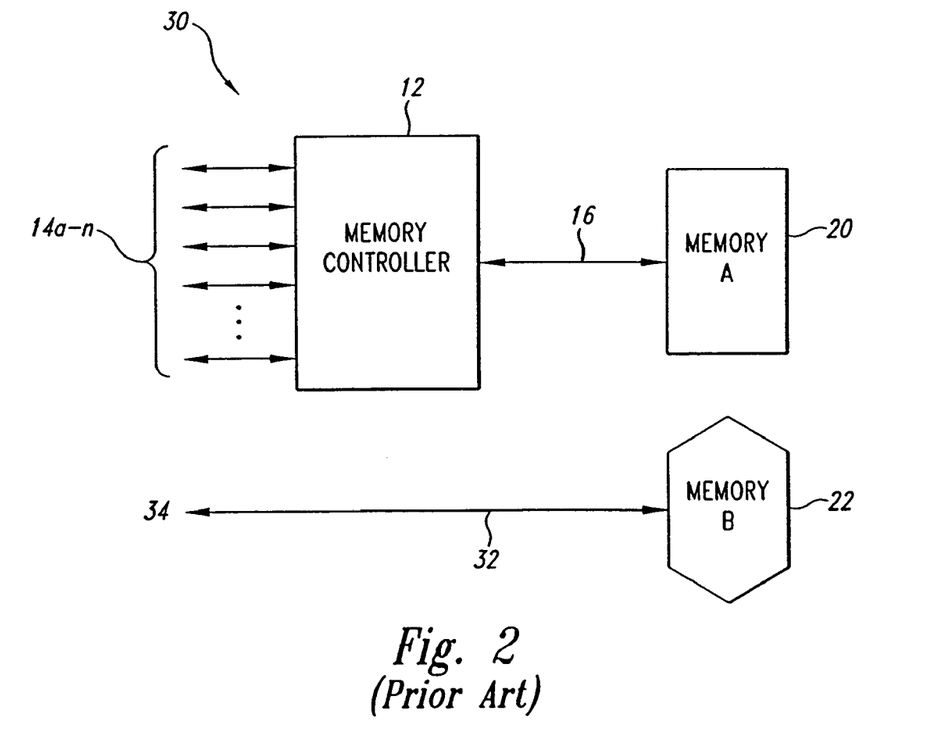
FIG. 2 is a block diagram of an alternative conventional heterogeneous memory system.

A second example of a heterogeneous memory system is shown in FIG. 2. Memory system 30 addresses some of the concerns raised by the memory system 10 of FIG. 1. The memory system 30 includes a central memory controller 12 coupled to a memory 20 through a memory bus 16. The central memory controller 12 services only the memory access requests made to memory 20. The memory system 30 also includes memory 22 directly coupled to a requesting entity through memory bus 32. Thus, memory access requests to memory 22 may be only made over the memory bus 32. The memory 20 may represent embedded memory, while the memory 22 may represent local memory. As illustrated in FIG. 2, all memory access requests to memory 20 are controlled by the central memory controller 12. However, access to the memory 22, is controlled directly by the requesting entity coupled to the bus 32. That is, access to memory 22 can be made only by the requesting entity hardwired to the bus 32.

The memory system 30 does, to some degree, resolve the issues with regards to the physical limitations of routing a plurality of request lines to a single central memory controller, as well as space overhead issues resulting from the complexity of using a central memory controller. However, a problem with the memory system 30 is that the allocation of available memory is fixed according to the design of the circuitry. That is, the memory 22 may be accessed only by the requesting entity to which it is coupled through bus 32. Any available memory in the memory 22 cannot be reallocated for another purpose, such as storing overflow data from the memory 20. Furthermore, memory access requests must be delegated prior to being made either to the central memory controller 12 or the memory 22, rather than having all memory access requests simply handled by a single central memory controller. Moreover, adding additional memory to the memory system 30 is made more difficult by the fixed arrangement. Additional memory cannot simply be reallocated, but must be added to supplement either memory 20 or memory 22, but not both.

Therefore, there is a need for a memory system where the number of memory access request lines to a memory controller is reduced and where the available memory may be allocated efficiently.

SUMMARY OF THE INVENTION

The present invention relates to a distributed memory controller memory system for a graphics processing system having addressable memory areas, each of which is coupled to a respective memory controller. Each memory controller accesses the addressable memory area to which it is coupled. The memory controllers are further coupled to each other through a memory controller bus upon which a memory access request and data may be passed from one memory controller to other memory controller. A memory access request to a memory location in one addressable memory area, but received by a memory controller coupled to another addressable memory area, is passed through the memory controller bus from the receiving memory controller to the memory controller coupled to the addressable memory area in which the requested location is located in order to service the memory access request. Additional addressable memory areas coupled to a respective memory controller may also be included in the memory system. The additional memory controllers are also coupled to the memory controller bus in order to receive and pass memory access requests from the other memory controllers. The addressable memory locations may be defined by values stored in registers in the respective memory controller in order for the memory controller to determine whether the requested location is within the memory area to which it is coupled.

DETAILED DESCRIPTION OF THE INVENTION

Embodiments of the present invention provide for a distributed memory controller arrangement that may be substituted for a memory system having a conventional central memory controller arrangement. Multiple memory controllers are arranged such that each memory controller is coupled to at least one addressable memory area which is accessible by the memory controller to which the addressable memory area is coupled. Each memory controller receives direct memory access requests from distinct requesting entities. The multiple memory controllers are coupled together by a memory controller bus, upon which data and indirect memory access requests may be passed from one memory controller to another if the requested address is outside of the addressable memory area to which the memory controller receiving the direct request is coupled.

Certain details are set forth to provide a sufficient understanding of the invention. However, it will be clear to one skilled in the art that the invention may be practiced without these particular details. In other instances, well-known circuits, control signals, timing protocols, and software operations have not been shown in detail in order to avoid unnecessarily obscuring the invention.

Figure 3:
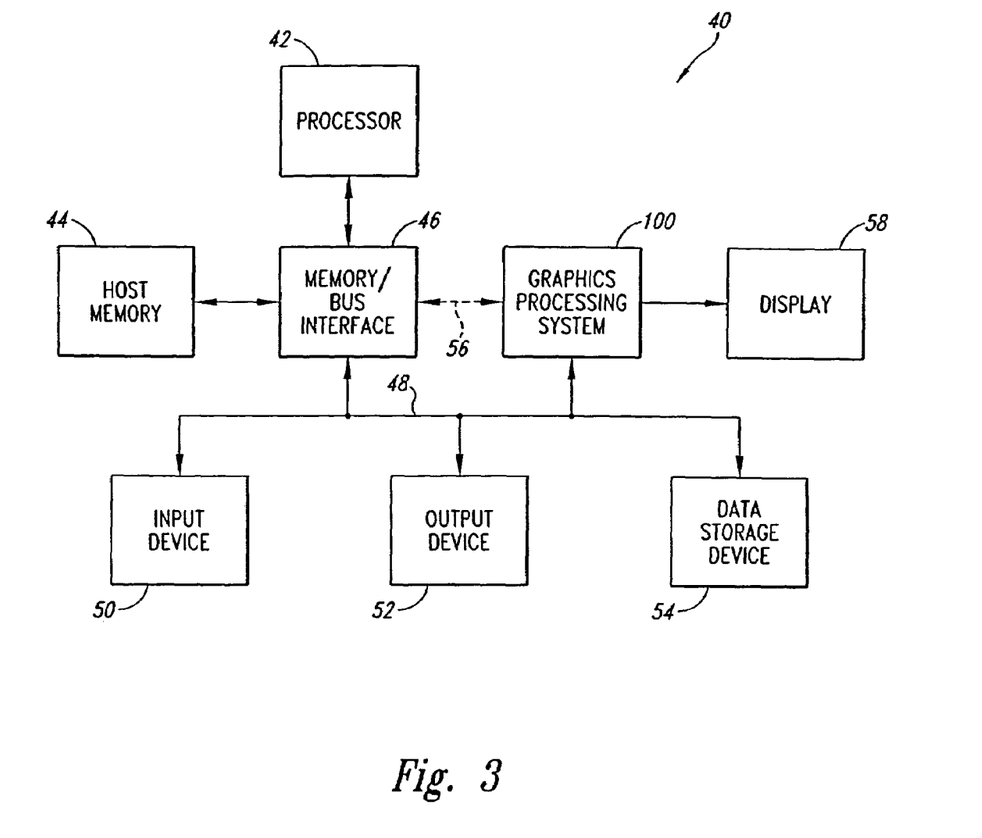
FIG. 3 is a block diagram of a computer system in which embodiments of the present invention are implemented.

FIG. 3 illustrates a computer system 40 in which embodiments of the present invention are implemented. The computer system 40 includes a processor 42 coupled to a host memory 44 through a memory/bus interface 46. The memory/bus interface 46 is coupled to an expansion bus 48, such as an industry standard architecture (ISA) bus or a peripheral component interconnect (PCI) bus. The computer system 40 also includes one or more input devices 50, such as a keypad or a mouse, coupled to the processor 42 through the expansion bus 48 and the memory/bus interface 46. The input devices 50 allow an operator or an electronic device to input data to the computer system 40. One or more output devices 52 are coupled to the processor 42 to provide output data generated by the processor 42. The output devices 52 are coupled to the processor 42 through the expansion bus 48 and memory/bus interface 46. Examples of output devices 52 include printers and a sound card driving audio speakers. One or more data storage devices 54 are coupled to the processor 42 through the memory/bus interface 46 and the expansion bus 48 to store data in, or retrieve data from, storage media (not shown). Examples of storage devices 54 and storage media include fixed disk drives, floppy disk drives, tape cassettes and compact-disc read-only memory drives.

The computer system 40 further includes a graphics processing system 100 coupled to the processor 42 through the expansion bus 48 and memory/bus interface 46. Optionally, the graphics processing system 100 may be coupled to the processor 42 and the host memory. 44 through other types of architectures. For example, the graphics processing system 100 may be coupled through the memory/bus interface 46 and a high speed bus 56, such as an accelerated graphics port (AGP), to provide the graphics processing system 100 with direct memory access (DMA) to the host-memory 44. That is, the high speed bus 56 and memory bus interface 46 allow the graphics processing system 100 to read from and write to the host memory 44 without the intervention of the processor 42. Thus, data may be transferred to, and from, the host memory 44 at transfer rates much greater than over the expansion bus 48. A display 58 is coupled to the graphics processing system 100 to display graphics images. The display 58 may be any type of display, such as a cathode ray tube (CRT), a field emission display (FED), a liquid crystal display (LCD), or the like, which are commonly used for desktop computers, portable computers, and workstation or server applications.

Figure 4A:
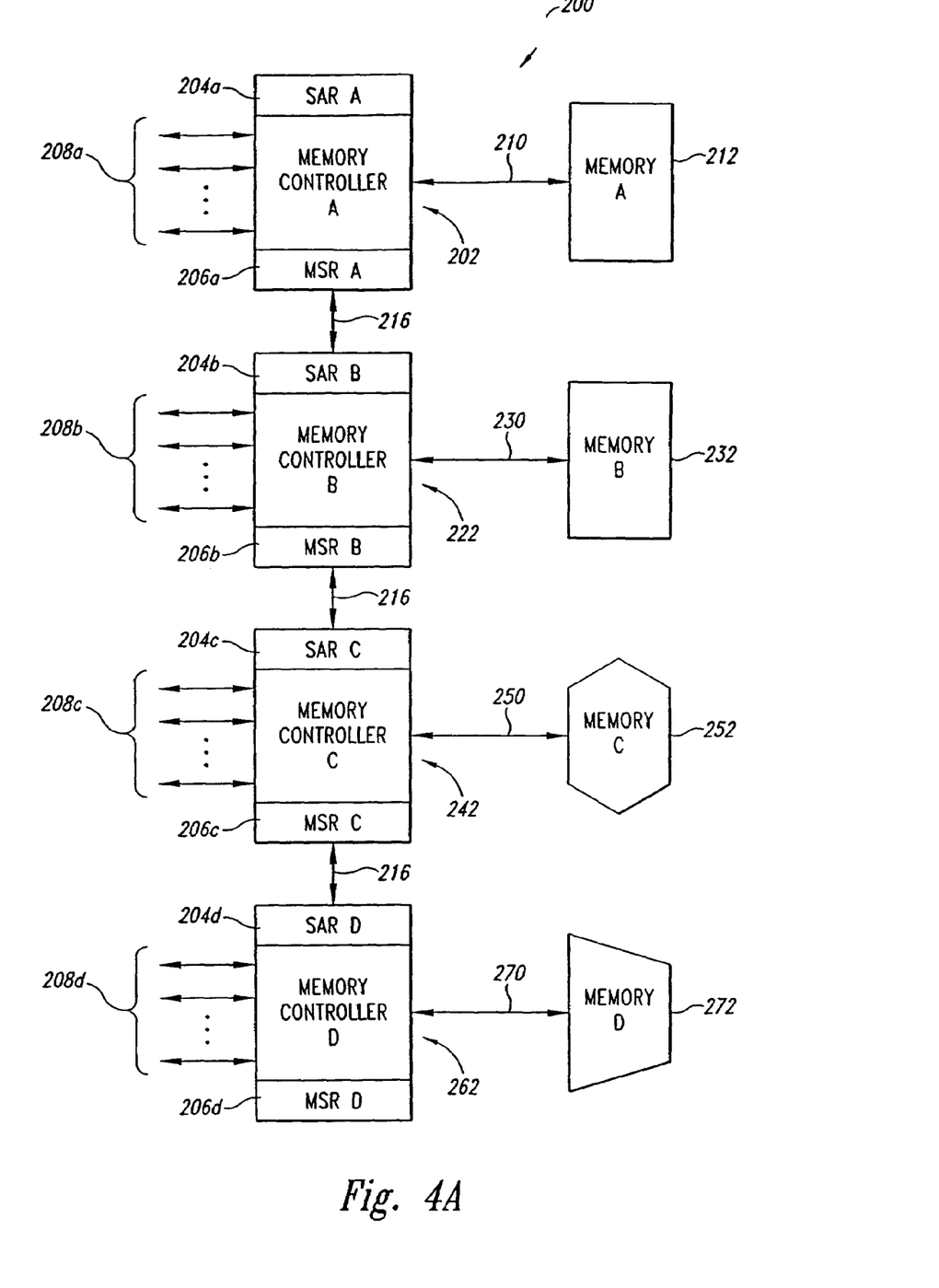
FIG. 4a is a block diagram of a memory system having a distributed memory controller arrangement according to an embodiment of the present invention.

FIG. 4 illustrates a memory system 200 according to an embodiment of the present invention. The memory system 200 includes separate memory controllers 202, 222, 242, and 262. Each of the memory controllers 202, 222, 242, and 262 controls and accesses a respective memory 212, 232, 252, and 272 through a memory bus that couples the memory controller to a memory. The memory controllers 202,222, 242, and 262 are also coupled to each other through a memory controller bus 216. Memory access requests, as well as data, may be transferred through the memory controller bus 216 from one memory controller to another.

Each of the memory controllers 202, 222, 242, and 262 is also coupled to a set of memory access request lines 208a–d on which the respective memory controller directly receives memory access requests. A memory controller receives direct memory access requests from those requesting entities coupled to its particular request lines. For example, the memory controller 202 will receive direct memory access requests over the memory access request lines 208a. In determining which requesting entities a particular memory controller should receive memory access requests, factors such as physical proximity of the requesting entity to a memory controller, the memory device which a requesting entity is most likely to access, and desired access speed may be considered. As will be discussed in greater detail below, indirect memory access requests can be made by one memory controller to another through the memory controller bus 216 if the requested address is not in the addressable memory area of the memory to which the memory controller receiving the direct memory access request is coupled.

Included in each memory controller 202, 222, 242, and 262 are a respective start address register (SAR) 204a–d and a respective memory size register 206a–d (MSR). With respect to the memory controller 202, the SAR 204a stores the start address of the addressable memory area of the memory 212, and the MSR 206a stores the size or the amount of available addressable memory area of the memory 212. Similarly, the remaining SARs 204b–d and MSRs 206b–d store the respective start addresses and sizes of the addressable memory area for the memory to which the memory controller is coupled. The values stored in the SARs and MSRs of the memory controllers may be programmed by an graphics application executing on the host processor 42 (FIG. 3) or, as will be described later, a graphics processor that is designed to perform graphics functions. The graphics application may update the values stored in the SARs and MSRs during execution in order to reallocate the addressable memory area. By storing the start address and size for the addressable area which each memory controller 202, 222, 242, and 262 controls, a memory controller can determine whether a direct memory access request it receives should be passed to another memory controller if the requested address is not within the range of the memory to which the memory controller receiving the direct memory access request is coupled.

Although the memory system 200 has been described as storing the start address and the amount of available addressable memory area for a memory, it will be appreciated that other values can be used to define the memory as well, such as, the start address and the end address of an addressable memory area. Thus, the particular type of values that are stored by the memory controllers to define the addressable memory area to which it is coupled are details that may be changed, but the resulting memory system will still remain within the scope of the present invention.

The following description of the operation of the memory system 200 is provided merely by way of an example, and should not be interpreted as limiting the scope of the invention. A person of ordinary skill in the art will appreciate that some of the details of the following example, such as the start addresses and size of the addressable memory area, have been selected merely for the purposes of the following example.

In the present example, the values programmed and stored in the SARs and MSRs for the memory controller 202 are 0000 and 1000, for the memory controller 222 are 1000 and 1000, for the memory controller 242 are 2000 and 2000, and for the memory controller 262 are 4000 and 3000. A direct memory access request is received by the memory controller 222 to access memory address 1A00. Based on the values stored in the SAR 204b and MSR 206b, that is, 1000 and 1000, respectively, the memory controller 222 determines that the requested address 1A00 is within the addressable memory area of the memory 232, and services the direct memory access request.

Another direct memory access request is received by the memory controller 222, but this time it is to access memory address 0C00. The memory controller 222 determines that the requested address is not within the addressable memory area of the memory 232 and must make an indirect memory access request to another memory controller in order to service the memory access request. The requested address is less than the 1000 value stored in the SAR 204b, and consequently, the memory controller 222 passes an indirect memory access request to a memory controller having a lower starting memory address through the memory controller bus 216, namely, to the memory controller 202. The memory controller 202 receives the indirect memory access request and determines whether the memory address of the indirect memory access request, namely 0C00, is within the addressable memory area of the memory 212. Based on the values stored in the SAR 204a and the MSR 206a, that is 0000 and 1000, respectively, the memory controller 202 determines that the address 0C00 is within the memory 212, and consequently services the memory access request. If the memory access request is a read command, then the memory controller 202 accesses the requested address, retrieves the data, and passes the data back to the memory controller 222. The memory controller 222 then completes the direct memory access request by providing the data read from the memory 212 by the memory controller 202 to the requesting entity. If the memory access request is a write command, the data is provided to the memory controller 202 along with the requested address through the memory controller bus 216 and is written into the memory 212 by the memory controller 202.

The distributed memory controller arrangement of the memory system 200 addresses the potential problem with physical limitations of the number of memory access request lines that may be routed to a central memory controller by dividing the total number of memory access request lines among different controllers. Thus, the number of memory access request lines to any one memory controller is reduced. Furthermore, the available memory of memories 212, 232, 252, and 272 may be reallocated if desired, and any memory added to the memory system 200 may be utilized in an efficient manner by changing the values stored in the SARs and MSRs of the memory controllers.

Figure 4B:
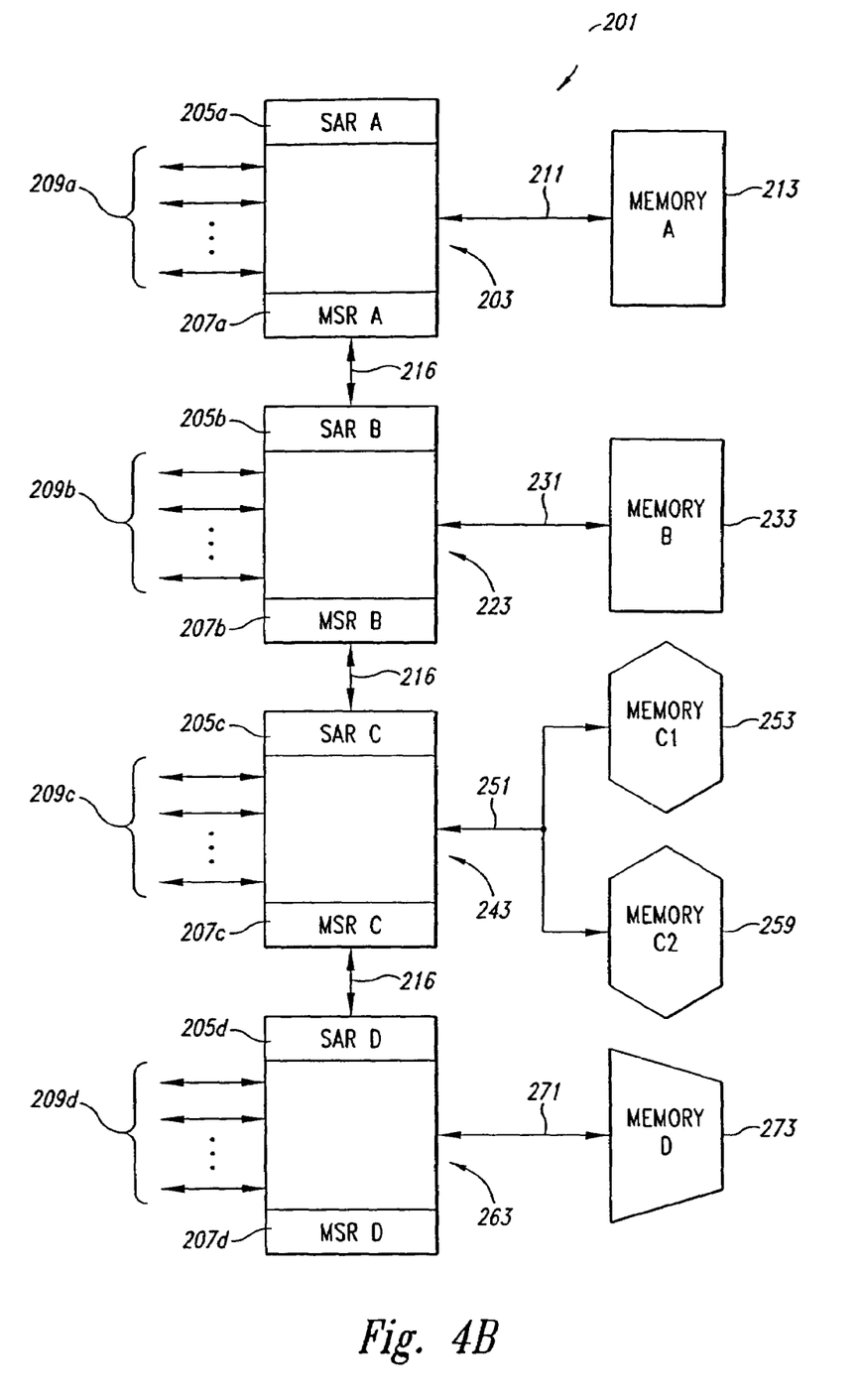
FIG. 4b is a block diagram of a memory system having a distributed memory controller arrangement according to another embodiment of the present invention.

A memory system 201 according to another embodiment of the present invention is shown in FIG. 4b. The memory system 201 is similar to the memory system 200 of FIG. 4a, except that memory controller 243 is coupled to both memories 253 and 259. Although the memory system 200 (FIG. 4a) is arranged such that there is a one-to-one correspondence between memory controllers 202, 222, 242, and 262, and a respective memory 212, 232, 252, and 272, the memory system 201 is arranged such that more than one memory device coupled to a single memory controller. The operation of the memory system 201 is generally the same as for the memory system 200, except that the value stored in the MSR 207c should span the combined size of memories 253 and 259. In this way, the memory controller 243 is able to recognize memory access requests for both the memories 253 and 259.

Figure 5:
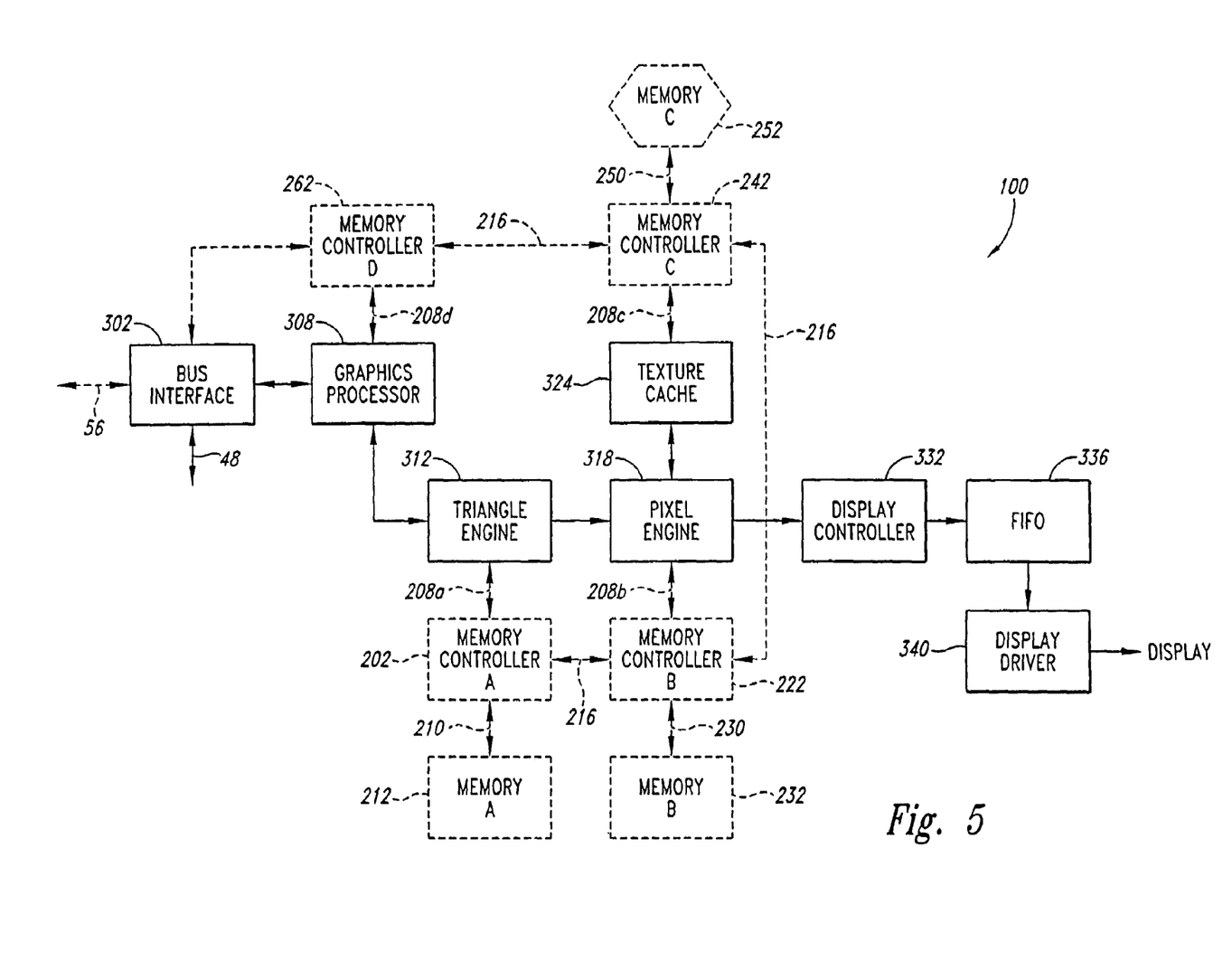
FIG. 5 is a block diagram of a graphics processing system including a distributed memory controller arrangement according to another embodiment of the present invention.

Illustrated in FIG. 5 is another embodiment of the present invention. A memory system similar to the memory system 200 (FIG. 4a) is used in the context of the graphics processing system 100 (FIG. 3). The graphics processing system 100 includes circuitry for performing various three-dimensional (3D) graphics function. As shown in FIG. 5, a bus interface 302 couples the graphics processing system 100 to the expansion bus 48. In the case where the graphics processing system 100 is coupled to the processor 42 and the host memory 44 through the high speed data bus 56 and the memory/bus interface 46, the bus interface 302 will include a DMA controller (not shown) to coordinate transfer of data to and from the host memory 44 and the processor 42. A graphics processor 308 is coupled to the bus interface 302 and is designed to perform various graphics and video processing functions, such as, but not limited to, generating vertex data and performing vertex transformations for polygon graphics primitives that are used to model 3D objects.

In a preferred embodiment, the graphics processor 308 is a reduced instruction set computing (RISC) microprocessor. The graphics processor 308 is coupled to a triangle engine 312 that includes circuitry for performing various graphics functions, such as clipping, attribute transformations, rendering of graphics primitives, and generating texture coordinates from a texture map.

A pixel engine 318 is coupled to receive the graphics data generated by the triangle engine 312. The pixel engine 318 contains circuitry for performing various graphics functions, such as, but not limited to, texture application or mapping, bilinear filtering, fog, blending, and color space conversion. Texture mapping refers to techniques for adding surface detail, or a texture map, to areas or surfaces of polygons used to model the 3D objects. After the texture mapping process, a version of the texture image is visible on surfaces of the polygon with the proper perspective. A typical texture map includes point elements ("texels") which reside in a texture coordinate space is stored in the host memory 44 of the computer system 40. A portion of the texture map that is currently being applied by the pixel engine 318 is stored in a texture cache 324 for quick access during texture processing. A display controller 332 coupled to pixel engine 318 controls the transfer of destination color values from the pixel engine 318 to a FIFO 336. Destination color values stored in the FIFO 336 are provided to a display driver 340 that includes circuitry to provide digital color signals, or convert digital color signals to red, green, and blue analog color signals, to drive the display 58 (FIG. 3).

Also included in the graphics processing system 100 is a distributed memory controller arrangement similar to the memory system 200 of FIG. 4a That is, instead of a conventional memory system having a central memory controller to service all memory access requests, the graphics processing system 100 uses a memory system where the responsibility of servicing the memory access requests is distributed among multiple memory controllers 202, 222, 242, and 262, coupled to a respective memory 212; 232, 252, and 44 (FIG. 3), and linked together through a memory controller bus 216. The operation of a distributed memory controller arrangement has been previously described with respect to FIG. 4.

Each of the memory controllers receives direct memory access requests from a respective circuit block to access the memory to which the memory controller is coupled. The arrangement of the memory controllers is based in part, as mentioned previously, the proximity of the memory and memory controller to a requesting entity, the desired access time, as well as the type of memory which the requesting entity is likely to access frequently.

In the graphics processing system 100, the memories 212 and 232 may be embedded memory fabricated on the same semiconductor substrate as the graphics processor 308, triangle engine 312, and pixel engine 318. Memory access times for memory access requests made by the triangle engine 312 and the pixel engine 318 will be relatively short because of the proximity of the embedded memories 212 and 232, which will facilitate fast graphics processing. The memory 252 may be implemented by external or local memory, which is, as mentioned previously, memory which is located with the graphics processing system 100, but is not fabricated on the same substrate as the graphics processing circuit blocks. Typically, local memory is implemented using random access memory (RAM), such as dynamic access memory (DRAM), or static random access memory (SRAM), located on the same graphics card as the graphics processor. Although the access time of the memory 252 is greater than for the embedded memories 212 and 232, it is still shorter than for the host memory 44 (FIG. 3). The rate at which texture data is provided to the pixel engine 318 is improved by the presence of the texture cache 324. That is, as mentioned previously, a subset of the texture data presently used for texture application is stored in the texture cache for fast access. The memory controller 262 is coupled to the host memory 44 (FIG. 3). Although the host memory 44 has the longest access time, it does have the benefit of having the greatest available addressable memory area. Graphics data that is not immediately needed by one of the processing blocks, or data that may be needed at a later time, may be stored in the host memory 44.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A memory system, comprising:
a plurality of addressable memory areas;
a memory controller command bus configured to couple memory commands thereon; and
first, second and third memory controllers serially coupled to one another by the memory controller command bus and coupled to a respective one of the plurality of addressable memory areas, each memory controller configured to access the respective addressable memory area in response to receiving memory commands for accessing a memory location in the respective addressable memory area and further configured to forward memory commands for accessing a memory location in another one of the addressable memory areas to the memory controller coupled to the addressable memory area in which the memory location of the memory command is located.

2. The memory system of claim 1 wherein at least one of the plurality of memory controllers comprises a memory controller having registers for storing data defining a range of the first addressable memory area and the at least one memory controller is configured to compare a memory address corresponding to the memory location to the stored data to determine whether the memory location is in the respective addressable memory area.

3. The memory system of claim 2 wherein the registers are configured to store data representing a start address for the respective addressable memory area and a addressable memory size.

4. The memory system of claim 2 wherein the registers are configured to store data representing a start address for the respective addressable memory area and an end address for the first addressable memory area for the respective addressable memory area.

5. The memory system of claim 1 wherein at least one of the plurality of addressable memory areas comprises an addressable memory area of dynamic random access memory ("DRAM") cells.

6. The memory system of claim 5 wherein the at least one of the plurality of addressable memory areas of DRAM cells comprises an addressable area of embedded memory of DRAM cells.

7. The memory system of claim 1 wherein at least one of the plurality of addressable memory areas comprises an addressable memory area for storing computer graphics data.

8. A computer system, comprising:
a system processor;
a memory interface circuit coupled to the system processor;
a system bus coupled to the memory interface circuit;
a graphics processing system coupled to the system bus; and
a system memory coupled to the memory interface circuit, the system memory comprising:
a plurality of addressable memory areas;
a memory controller command bus configured to couple memory commands thereon; and
first, second, and third memory controllers serially coupled to one another by the memory controller command bus and coupled to a respective one of the plurality of addressable memory areas, each memory controller configured to access the respective addressable memory area in response to receiving memory commands for accessing a memory location in the respective addressable memory area and further configured to forward memory commands for accessing a memory location in another one of the addressable memory areas to the memory controller coupled to the addressable memory area in which the memory location of the memory command is located.

9. The memory system of claim 8 wherein at least one of the plurality of memory controllers comprises a memory controller having registers for storing data defining a range of the first addressable memory area and the at least one memory controller is configured to compare a memory address corresponding to the memory location to the stored data to determine whether the memory location is in the respective addressable memory area.

10. The memory system of claim 9 wherein the registers are configured to store data representing a start address for the respective addressable memory area and a addressable memory size.

11. The memory system of claim 9 wherein the registers are configured to store data representing a start address for the respective addressable memory area and an end address for the first addressable memory area for the respective addressable memory area.

12. The memory system of claim 8 wherein at least one of the plurality of addressable memory areas comprises an addressable memory area of dynamic random access memory ("DRAM") cells.

13. The memory system of claim 12 wherein the at least one of the plurality of addressable memory areas of DRAM cells comprises an addressable area of embedded memory of DRAM cells.

14. The memory system of claim 8 wherein at least one of the plurality of addressable memory areas comprises an addressable memory area for storing computer graphics data.

15. A method of accessing a memory location in a memory system having at least one addressable memory area, comprising:
receiving at a memory controller a memory access request to access the memory location;
determining whether the memory controller has access to the memory location;
in response to determining that the memory controller has access to the memory location, accessing the memory location;
in response to determining that the memory controller does not have access to the memory location, forwarding the memory access request to one of a plurality of memory controllers serially coupled to one another and to the memory controller that received the memory access request through a memory controller bus;
repeating the steps of receiving, determining, and forwarding until a target memory controller determines that it has access to the memory location; and
accessing the memory location through the target memory controller.

16. The method of claim 15 wherein determining whether the memory controller has access to the memory location comprises determining whether the memory location is located within an addressable memory area coupled to the respective memory controller.

17. The method of claim 16 wherein determining whether the memory location is located within an addressable memory area coupled to the respective memory controller comprises comparing a memory address corresponding to the memory location to data defining a range of addressable memory to which the respective memory controller has access.

18. The method of claim 17 wherein the comparing the memory address to data defining a range of addressable memory comprises comparing the memory address to first and second data defining a start address and addressable memory size, respectively, for the respective range of addressable memory.

19. The method of claim 17 wherein the comparing the memory address to data defining a range of addressable memory comprises comparing the memory address to first and second data defining a start address and an end address, respectively, for the respective range of addressable memory.

* * * * *